(12) United States Patent
Juhel et al.

(10) Patent No.: US 6,198,048 B1
(45) Date of Patent: Mar. 6, 2001

(54) DEVICE FOR MOUNTING A CABLE

(75) Inventors: Alain Juhel, Donges; Olivier Perdriau, Nantes, both of (FR)

(73) Assignee: Pouyet, S.A. (FR)

( * ) Notice: Subject to any disclaimer, the term of this patent is extended or adjusted under 35 U.S.C. 154(b) by 0 days.

(21) Appl. No.: 09/194,852

(22) PCT Filed: Jun. 2, 1997

(86) PCT No.: PCT/FR97/00950

§ 371 Date: Dec. 2, 1998

§ 102(e) Date: Dec. 2, 1998

(87) PCT Pub. No.: WO97/47063

PCT Pub. Date: Dec. 11, 1997

(30) Foreign Application Priority Data

Jun. 5, 1996 (FR) .................................................. 96 06911

(51) Int. Cl.[7] ...................................................... H01R 4/00
(52) U.S. Cl. .......................... 174/84 R; 174/92; 174/93; 174/70 A
(58) Field of Search .................................. 174/77 R, 92, 174/70 A, 93, 84 R, 138 F

(56) References Cited

U.S. PATENT DOCUMENTS

| | | | |
|---|---|---|---|
| 4,002,818 | * | 1/1977 | Knuze .................................. 174/21 R |
| 4,203,000 | * | 5/1980 | Muller ..................................... 174/92 |
| 4,933,512 | * | 6/1990 | Nimiya et al. .......................... 174/92 |
| 5,313,019 | * | 5/1994 | Brusselmans et al. ................. 174/93 |
| 5,792,991 | * | 8/1998 | Nolf ....................................... 174/92 |

* cited by examiner

Primary Examiner—Kristine Kincaid
Assistant Examiner—William H Mayo, III
(74) Attorney, Agent, or Firm—Richard P. Gilly

(57) ABSTRACT

A device for mounting a cable in a cable protection sleeve that makes use of a disc (101;102). Among the disc's various structural features, the disc has a front face or surface, that is, one which is intended to face towards the outside of the sleeve. The front face of the disc includes at least one cable securing mechanism (140;141) which, in turn, includes a cable securing flange (141, 4, 4) enclosed in a housing (120; 20, 20; 20, 23, 20) formed on the front face of the disc. When the cable securing flange is received in the housing, a cable secured relative to the disc by the flange resists outwardly directed tensile forces, as well as torsion and bending moments applied to the cable.

16 Claims, 5 Drawing Sheets

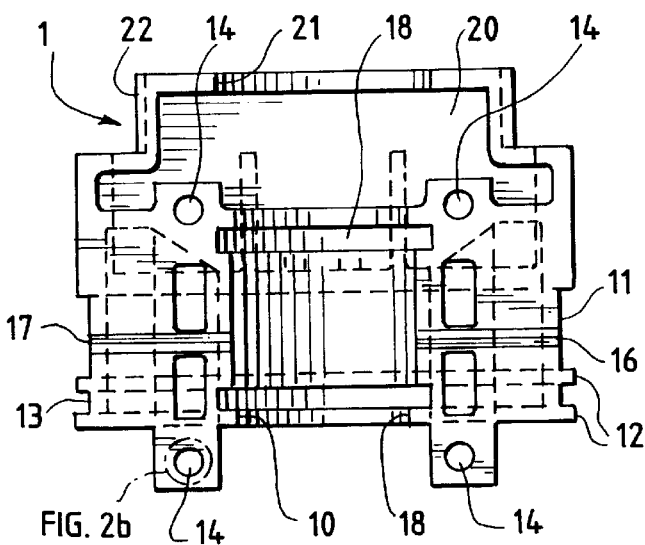
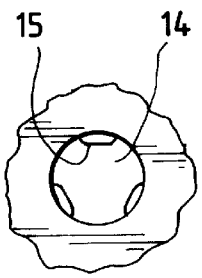
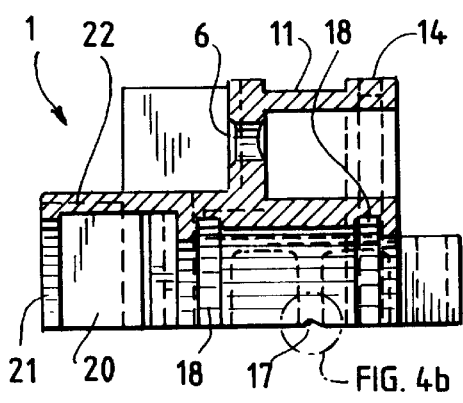
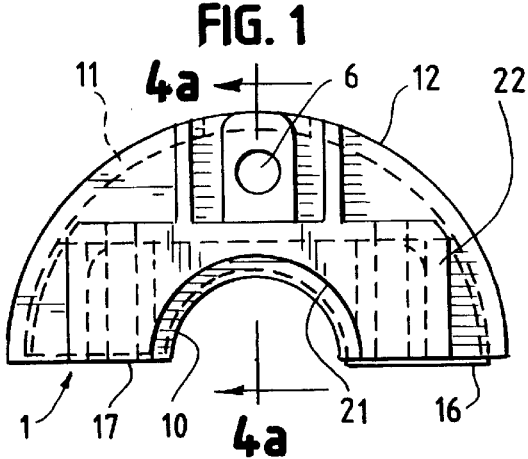
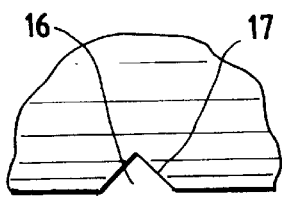
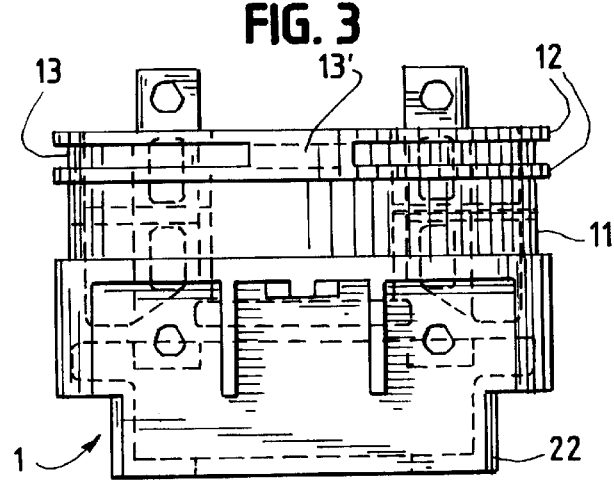

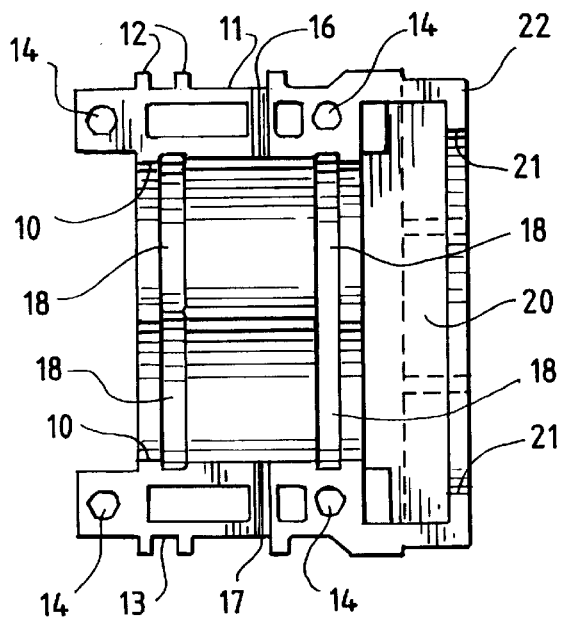
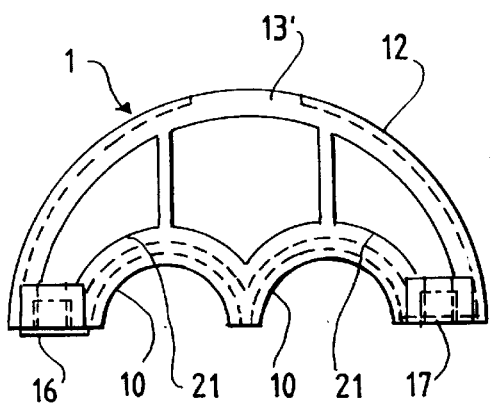
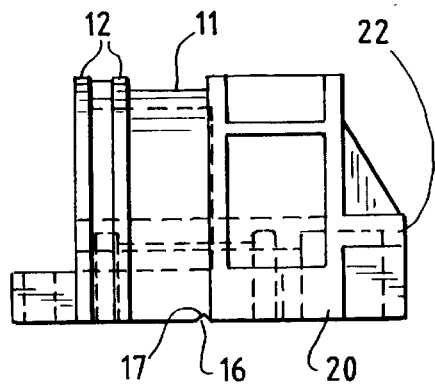
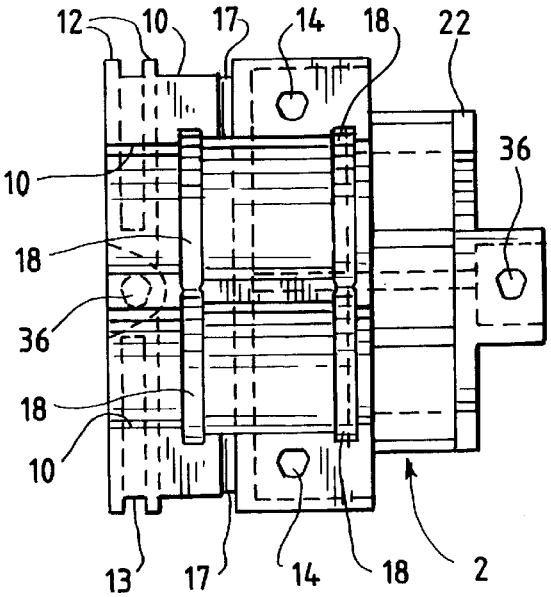
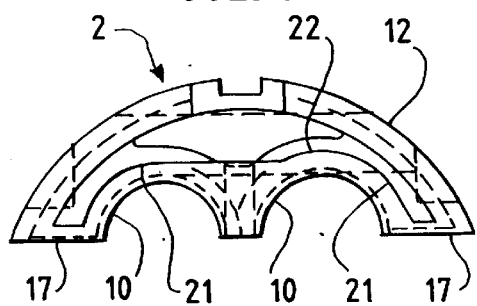
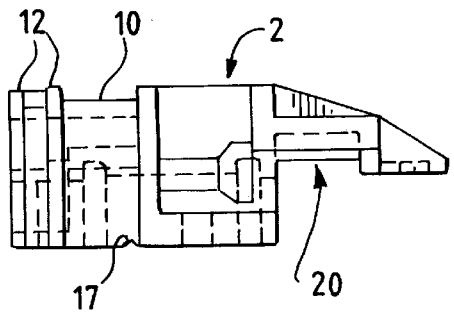

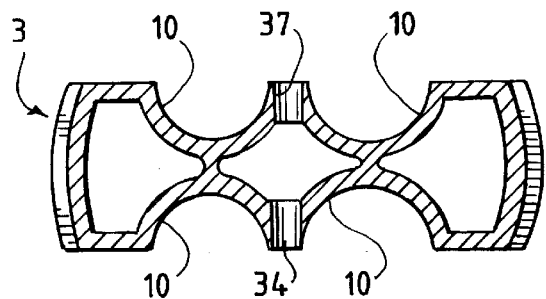
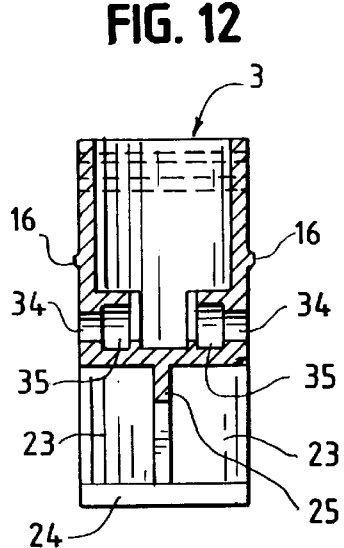
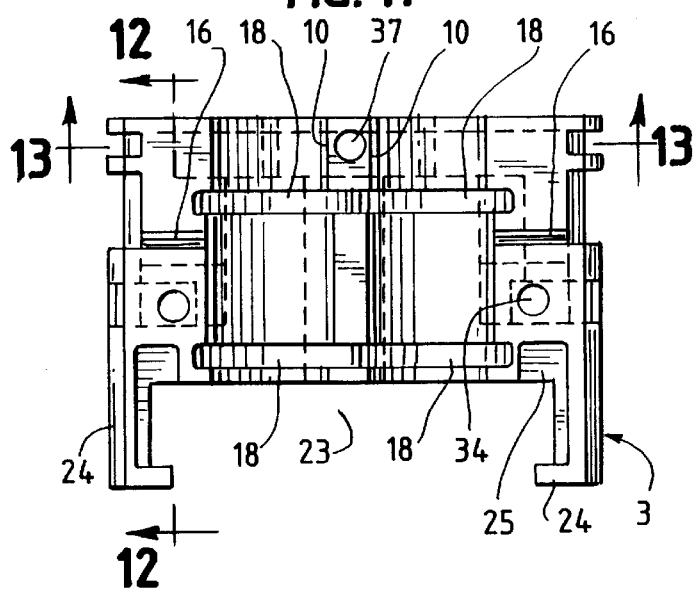
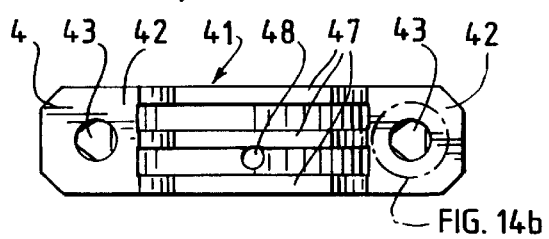
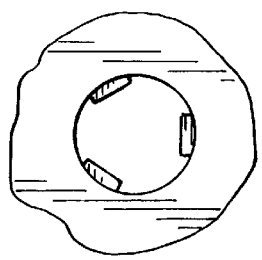
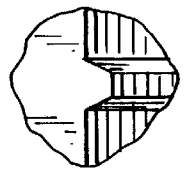
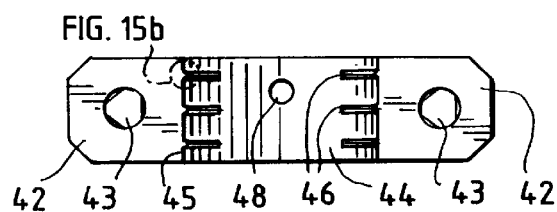

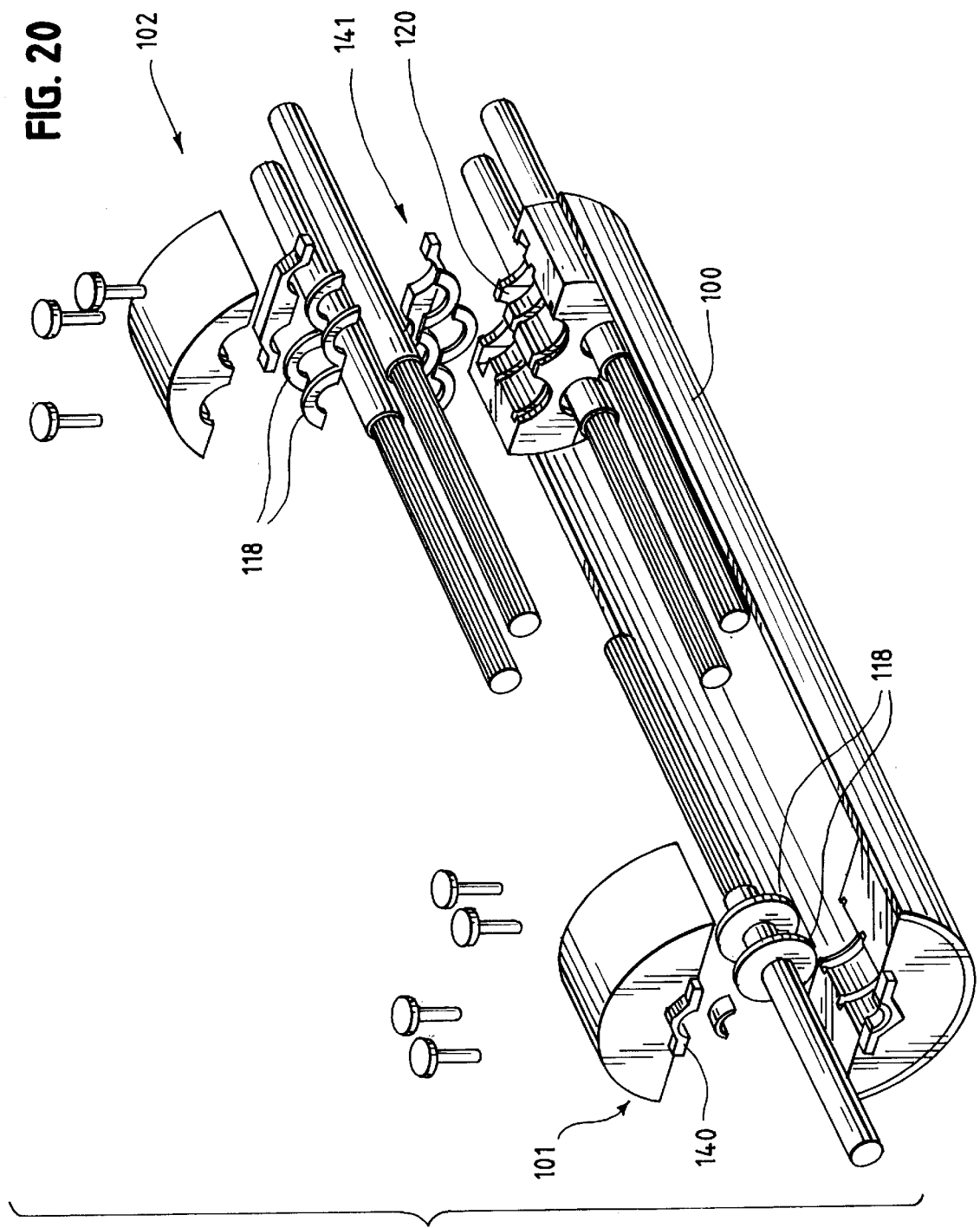

DEVICE FOR MOUNTING A CABLE

FIELD OF THE INVENTION

The present invention generally relates to a protection sleeve used for insulating from the environment the connected ends of cables, for example cables of a communication network.

Such sleeves are usually made of plastics material and make it possible to protect the connection from mechanical shocks and corrosion. They comprise, in manner known per se, two discs disposed respectively around the incoming cable or cables and the outgoing cable or cables and an overall cylindrical envelope positioned around said discs to hermetically close the space included between these discs, in which the connection of the cables is effected. The envelope is usually constituted either by two shells fixed on one another by their longitudinal edges, or by a longitudinally split tube.

The present invention concerns more particularly a device for mounting the incoming or outgoing cable or cables of said sleeve in the discs.

Although the discs can be formed in one piece presenting cable-passage openings through which the cables are threaded, the discs usually employed are designed in several elements in order to allow their positioning and fixation on either side of the cable or cables without cutting said cables.

DESCRIPTION OF THE RELATED ART

The known devices most often present a disc in two elements for the passage of one or two cables, the latter then being positioned in the plane of join of the two elements corresponding to a diameter of the disc. When three or four cables must be maintained, the disc is separated into three elements, for example along two planes of join parallel to a diameter.

It has been ascertained that a considerable problem raised in the implementation of the protection sleeves is that of the securing of the cables. Such securing must be such that the cables cannot be induced to slide in the discs when they are subjected to an outside traction. It is also useful to control the direction in which the cables enter in the discs and to avoid the bending or torsion of the cable at the level of its entrance in the disc.

In effect, when the cables are induced to slide with respect to the discs or no longer to be disposed correctly with respect thereto under the effect of a torsion or a bending, the tightness of their passage through the disc risks being destroyed. Moreover, upon slide of a cable, the splices for connection made on this cable may be damaged.

The arrangements proposed at the present time for effecting securing of the cables on the sleeve are not entirely satisfactory, as they avoid the slide of the cables in the discs but do not prevent a torsion or a bending from being imparted to the cable in its zone where it enters in the disc.

This is the case for example of the device proposed in U.S. Pat. No. 4,538,021 and U.S. Pat. No. 4,558,174, in which the discs present a tubular extension directed towards the interior space of the sleeve and bear stirrup elements with toothed portion which are tightened on the cable by a clamping ring.

SUMMARY OF THE INVENTION

The invention proposes to solve this problem by providing a device ensuring a good-quality securing of the cables entering and leaving the sleeve.

To that end, the invention relates to a device for mounting at least one cable in a disc, constituted by at least two elements, intended to be located in a cable connection protection sleeve, characterized in that said disc bears, on its front face intended to face towards the outside of the sleeve, at least one cable securing means fixedly held relative to the said disc by fixing means.

The device according to the invention is further noteworthy in that:

- the securing means comprises a securing flange made in several parts, each securing flange part being fixed to the disc, by being moulded in one piece with an element of the disc,
- the securing means comprises a securing flange enclosed in a housing formed on the front face of the disc,
- when the disc is formed by two elements, each element comprises a trough borne by its front face,
- when the disc is formed by three elements, the housing intended for positioning the securing means is formed by two troughs respectively on each edge element and by two troughs formed on the intermediate element,
- the trough is overall parallelepipedic and presents towards the front at least one opening, each opening being aligned axially with each cable passage presented by the disc,
- the housing is formed by walls moulded with the disc elements,
- the discs are positioned in the envelope by the cooperation of two parallel ribs separated by a hollow in the peripheral wall of the disc with a rib formed on the inner face of the envelope, the hollow being interrupted in a zone positioned in an interruption of the rib borne by the inner face of the envelope,
- the cable securing flange is constituted by two halves intended to be disposed and fixed on one another on either side of the cable or cables to be secured, each flange half presenting a central zone, of overall parallelepipedic space requirement and comprising at least one semi-cylindrical passage for the passage of the cable or cables to be secured, and two end zones traversed by openings intended for the passage of the fixing means,
- the inner wall of the passage bears at least one projecting rib,
- the securing means comprises stackable securing rings intended to be positioned in the securing flange,
- positioning means are formed on said securing rings so as to facilitate stacking thereof and to avoid their relative slide with respect to one another,
- said positioning means comprise grooves that the outer surface of the rings bears, and ribs borne by the inner surface of said rings,
- said positioning means comprise a stud adapted to be positioned in an opening, the stud and the opening being disposed in the upper zone of the ring.

BRIEF DESCRIPTION OF THE DRAWINGS

The invention will be more readily understood on reading the following description given by way of non-limiting example with reference to the accompanying drawings, in which:

FIG. 1 is a front view of an element of a two-part disc allowing the passage of a cable.

FIG. 2a is a view from underneath of the element shown in FIG. 1 and

FIG. 2b is an enlarged view of detail II.

FIG. 3 is a plan view of the disc element shown in FIG. 1.

FIG. 4a is a view along section IV—IV of FIG. 1 and

FIG. 4b is an enlarged view of detail IV. Detail IV is shown in FIG. 4A and is in medial plane with respect to the plane of section of IV—IV.

FIGS. 5, 6 and 7 represent an element of a two-part disc allowing the passage of two cables, respectively in front, underneath and side view.

FIGS. 8, 9 and 10 represent an edge element of a three-part disc allowing the passage of four cables, respectively in front, underneath and side view.

FIG. 11 shows an intermediate element of a three-part disc allowing the passage of four cables in plan view.

FIG. 12 is a view along section XII—XII of FIG. 11.

FIG. 13 is a view along section XIII—XIII of FIG. 11.

FIG. 14 is a plan view of half of a two-part securing flange for a cable with an enlarged view of detail XIV.

FIG. 15 is a view from underneath of half of a two-part securing flanges for a cable with an enlarged view of detail XV.

FIG. 20 is a partially exploded view in perspective of a sleeve bearing two discs each made in accordance with a variant embodiment of the invention.

DETAILED DESCRIPTION OF THE DRAWINGS

Figure 16:
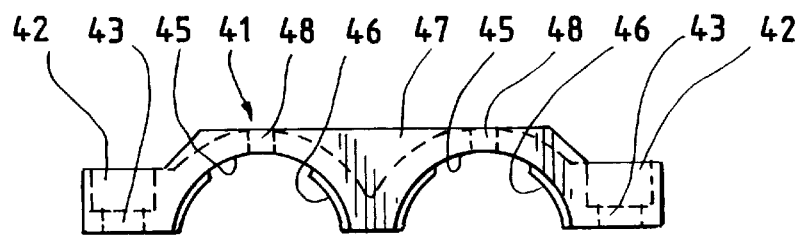
FIG. 16 is a front view of half of a two-part securing flange for two cables.

As shown schematically in FIG. 20, a protection sleeve comprises in manner known per se two discs 101, 102, disposed respectively around the incoming cable or cables and outgoing cable or cables and an overall cylindrical envelope 100 positioned around said discs in order tightly to close the space included between these discs, only one half of said envelope 100 having been shown.

In the embodiments shown in the drawings generally of FIGS. 1–19, the discs 101, 102 (FIG. 20) are designed to include two elements 1 (FIGS. 1–7) when they are intended to maintain one or two incoming or outgoing cables of the protection sleeve, and to include three elements 2, 3 (FIGS. 8–13) when they are intended to maintain more than two cables.

In the present description, the front face of an object, such as discs 101, 102, is the face directed towards the outside of the sleeve when this object is mounted in a sleeve.

As visible in the embodiment of FIGS. 1–4a and 4b and the embodiment shown in FIGS. 5–7 and in manner known per se, an element 1 of a disc made of two elements presents the overall shape of a half-cylinder and comprises a number of internal semi-cylindrical passages 10 equal to the number of cables which must be maintained in position in the disc.

In manner known per se, each semi-cylindrical passage 10 comprises two annular housings 18 disposed at a distance from one another.

These housings 18 are intended for positioning sealing washers 118, visible in FIG. 20, disposed on either side of a sealing means surrounding the cable, constituted for example by a tape wound on the cable or by a sealing gel.

Element 1 includes a peripheral wall with a groove 11 therein, and has a diameter such that an O-ring positioned in the groove 11 allows element 1 to be positioned against the inner wall of the envelope 100 (FIG. 20).

As best seen in FIGS. 2a, 6, and 7, said peripheral wall bears two parallel ribs 12, the first rib separated from the second rib by a hollow 13 so as to allow longitudinal positioning of the disc in the envelope 100. During closure of the sleeve, said first and second ribs 12 are disposed on either side of a third rib formed on the inner face of the envelope 100 (FIG. 20) in order that the third rib penetrates in the hollow 13. This arrangement makes it possible to avoid any longitudinal displacement of the discs 101, 102 in the envelope 100.

As shown in FIG. 3, the hollow 13 is interrupted in a zone 13'. The third rib, borne by the inner face of the envelope 100, is also interrupted to allow positioning of this zone 13'. In this way, there is circumferentially obtained a succession of portions of the third rib of the envelope 100 and of zone 13' without hollow of the disc which allows a blockage in rotation of said disc with respect to the envelope 100.

According to a variant embodiment (not shown in the drawing), the blocking in rotation of the disc in the envelope may be rendered even more efficient by the formation of fingers projecting from the inner face of the envelope and intended to be inserted in bores in the disc.

During assembly, two of the disc elements 1 (one of which is shown in FIG. 1–4a and 4b and 5–7) are positioned on either side of the cable or cables, in abutment on each other by their diametral plane and are fixed to each other by fixing means positioned in the holes 14. In the examples shown in the drawing, it is provided to use screws (not shown), engaging with nuts, likewise not shown. Studs 15 visible in FIG. 2b make it possible to ensure hold of the screws in order to render them captive. According to a variant embodiment (not shown in the drawings), check means are positioned in the diametral plane of each element to ensure that assembly of the disc has been suitably effected.

As is visible in the Figures, particular FIGS. 2a and 6, the diametral plane of the disc element 1 presents a rib 16 on one side and a groove 17 on the other side. Said ribs 16 and grooves 17 are of similar section, for example the one shown in the enlargement of FIG. 4b, and are positioned so that the rib 16 of the upper half penetrates in the groove 17 of the lower half, and vice versa for the rib 16 of the lower half and groove 17 of the upper half.

These ribs 16 and grooves 17 are disposed transversely on the plane diametral faces of the disc elements 1 so as to ensure a link between the sealing means disposed inside the disc, around the cables, and the sealing means disposed around the disc, against the envelope, this making it possible to improve the tight assembly of the sleeve. Such seal may be further improved by coating the plane faces with a sealing gel.

The disc elements 1 are made by moulding plastics material. To that end, recesses are provided so as to reduce the volume of matter and to avoid the production of walls which are too thick. These recesses will not be described in detail here.

According to the invention, the disc 101, 102 (FIG. 20) bears on its front face directed towards the outside of the sleeve a means for securing the cable or cables which pass(es) therethrough, said securing means being maintained fixed with respect to the disc.

FIG. 20 schematically shows two variant embodiments of the invention.

Disc 101, in which one cable is disposed, is composed of two elements 1 (FIGS. 1–7) each bearing a portion of cable securing flange 140. These securing flange portions are fixed to the disc, being moulded in one piece With each element of the disc.

In the variant embodiment shown for the disc 102, the securing means 141 is of the type such as the one which will be described hereinafter with respect to FIGS. 14 to 19, and is positioned in a housing 120 that the disc resents.

In the embodiments of two-element disc shown in FIGS. 1 to 7, each element 1 comprises a trough 20 borne by its front face.

This trough 20 is overall parallelepipedic and presents towards the front an opening 21, semi-circular in the embodiments shown in the drawing, axially aligned with each semi-cylindrical passage 10 for passage of cable, it is formed by a wall 22 moulded with the disc element 1.

The open edge of the trough 20 extends in the same plane as the plane diametral wall of the element 1. The hoeing formed by the two troughs 20 when the disc elements are positioned on one another, is then a closed housing.

FIGS. 8 to 13 show an embodiment of a disc composed of three elements such as the disc 102 of FIG. 20, two edge elements shown in FIGS. 8 to 10 being intended to be positioned on either side of an intermediate element shown in Figures 11 to 13.

In this embodiment, two cables may be positioned between each of the edge elements 2 and the intermediate element 3. It may, of course, be provided to position only one cable between an edge element and the intermediate element so as to dispose two cables one above the other or three cables.

So as to simplify the description, the objects similar to those of the preceding Figures and for which virtually only a adaptation has been made, keep the same reference.

The elements of such a three-pet disc are designed by dividing said disc along two planes parallel to a diameter and disposed on either side thereof.

The edge elements 2 are in that case elements presenting an outer wall constituted by a cylindrical portion with dimensions smaller than those of a semi-cylinder and by a plane face. These edge elements have a height shorter than the radius of the disc.

The intermediate element 3 presets two plane faces joined by cylindrical portions.

Said edge elements 2 comprise semi-cylindrical passages 10 opening in their plane face and intended to cooperate with semi-cylindrical passages 10 opening in each plane face of the intermediate element 3.

In certain forms of embodiment, as shown in the drawing, the semi-cylindrical passages 10 provided in one face of the intermediate element 3 are of diameter different from those provided in the other face, said diameters being very close to one another.

In that case, different edge elements 2 are used to form the disc and check means are provided on the plane faces of said edge elements and the intermediate element which are in register.

Fixing elements disposed in the holes 14 (FIG. 9) ensure fixation of an edge element 2 to the intermediate element 3 by cooperating with stop means positioned in the recesses 35 of the cavities 34 (FIGS. 11, 12) presented by the intermediate element in register with each hole 14.

The edge elements 2 present to bores 36 (FIG. 9) disposed respectively near their front face and near their rear face.

The fixing means disposed in these bores 36 ensure fixation of one edge element with respect to the other by tightening on the intermediate element. To that end, the screw disposed in the bore 36 located to the rear traverses without cooperation the passage 37 (FIGS. 11, 13) of the intermediate element, while the one positioned in the bore 36 to the front extends to the front of the housing created on the front face for positioning the securing means.

By such an arrangement, it is possible to intervene on the cables fixed between an edge element and the intermediate element without acting on the fixation of the cables positioned between said intermediate element and the other edge element.

In this embodiment, the housing intended for positioning the securing means is a double housing constituted by two troughs 20 formed respectively on each edge element 2 by a wall 22, and by two troughs 23 formed on the intermediate element 3 by two L-walls 24 and a plane wall 25.

In the embodiment shown in the drawing, the plane wall 25 is limited to a strip of small dimensions.

In the embodiments shown in the drawing, the securing means are constituted by a securing flange and by rings.

Two forms of embodiment of the cable securing flange are proposed, one for securing one cable, shown in FIGS. 14 and 15, and the other for securing two cables, shown in FIG. 16.

The cable securing flanges are constituted by two halves 4 disposed on one another on either side of the cable or cables to be secured.

Each flange half presents a central zone 41 and two end zones 42 traversed by openings 43 intended for the passage of the fixing means retained by studs 44.

The central zone 41 is of overall parallelpipedic space requirement and comprises one or two semi-cylindrical passages 45 for the passage of the cable or cables to be secured.

As is visible in FIGS. 15 and 16, the inner wall of the passage 45 bears projecting ribs 46. A plurality of ribs 46 e provided over the length of the flange half. The flanges shown in the drawing comprise three ribs 46 regularly distributed along the passage 45, these ribs 46 not extending over the whole circumference of the passage 45 but solely near the opening of the flange half.

The upper face of the central zone is plane and formed by stiffening ribs 47 disposed above the tubular walls forming the semi-cylindrical passages 45.

Before mounting the discs on the cables, the two halves of the securing flange are fixed to one another after having been disposed on either side of the cable or cables to be secured.

Securing rings are provided in order to fill the volume existing around the cable when the latter is not of sufficient diameter to fill the semi-cylindrical passage 45.

Figure 18B:
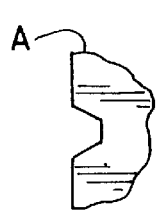
FIGS. 17, 18 and 19 are views, respectively front, underneath with enlargement of details A and B, and plan with enlargement of detail XIX, of half of a two-part securing ring.
Figure 18A:
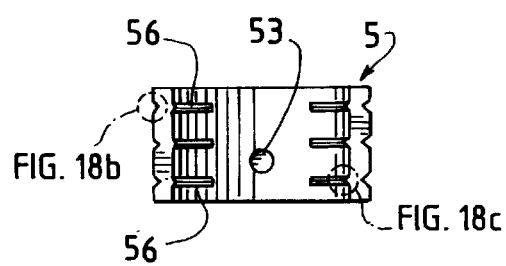
Figure 18C:
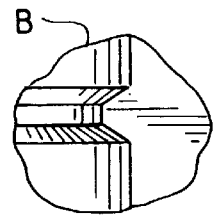
Figure 17:
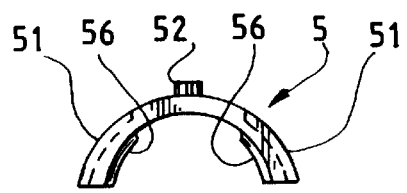
Figure 19A:
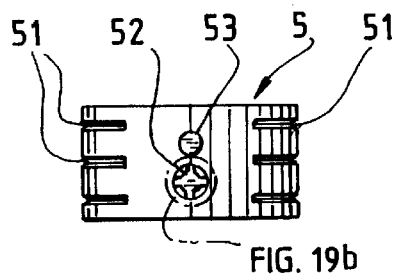
Figure 19B:

These rings shown in FIGS. 17 to 19 are likewise made in two semi-cylindrical parts 5 so as to be able to be disposed on either side of the cable.

A set of several rings of outer and inner diameter adapted so as to be able to dispose them in one another is proposed. In this set of rings, the largest ring has an outer diameter equal to the inner diameter of the flanges, then each ring has an outer diameter equal to the inner diameter of the preceding ring in the decreasing order of size. During assembly, the user positions the appropriate rings around the cable which he is to connect, until the last ring is fitted in the inner passage 45 of the securing flange.

Positioning means are formed on said rings so as to facilitate stacking thereof and to avoid relative slide with respect to one another.

These positioning means comprise grooves 51 that the outer surface of the rings bears, and ribs 56 borne by the inner surface of said rings.

The grooves 51 of the largest ring are adapted to be positioned on the ribs 46 of the flange. These grooves are distributed over the surface of the ring in the same manner as the ribs 46 of the flange and are of section adapted to be positioned on said ribs 46.

Ribs 56 are ribs similar to ribs 46 of the flange, distributed in the same manner thereas.

The grooves 51 and ribs 56 of each ring are adapted to be respectively positioned on the ribs of the ring of largest dimension and in the grooves of the ring of smallest dimensions.

The positioning means further comprise a lug 52 adapted to be positioned in arms opening 53. In the example shown in the drawing, the lug 52 and the ring opening 53 are disposed in the upper zone of the ring.

As is visible in FIGS. 14 to 16, the flanges present a flange opening 48 similar to ring openings 53 of the rings so as to allow positioning of the lug 52 of the largest ring.

During stacking of the rings on the cable, said rings are disposed head to tail in order to position the lugs in the openings.

When a connection is made, the user firstly arranges the rings, if they are necessary, around the cable, taking care to begin with a ring of inner diameter slightly smaller than the outer diameter of the cable. When the stacking of the rings is terminated, he positions the two flange halves 4 and fixes them to each other. During this fixation, the smallest ring penetrates partly in the sheath of the cable, this ensuring maintenance in translation of said cable in said flange.

The user then positions the sealing washers at distances from the flange specified by the supplier, then arranges sound the cable a winding of sealing tape when this is provided.

The cable thus prepared is then positioned in a lower disc element chosen as a function of the number of cables to be connected. The sealing washers are positioned in the housings 18 while the securing flange is disposed in the trough 20.

When the suitable number of cables has been disposed in the lower element, the latter is covered by an upper half or by an intermediate disc element, care being taken to position again the sealing washers in the housings 18 and the trough 20 or the trough 23 around the sealing flange. The two disc elements are then fixed to one another.

The wall 25 separating the two troughs 23 from an intermediate element is of sufficient dimension to be applied against the upper face of the securing flange.

If the seal of the cable passage is effected with the aid of a gel, this gel is injected via an injection orifice after the disc elements have been fixed.

During assembly of a disc composed of three elements, the preceding steps are again effected with the cables and the upper edge element, the securing flange maintaining the cables of the upper level in place being placed in the trough 23 disposed above the securing flange maintaining in place the cables of the lower level.

By such an assembly which may be effected simply and rapidly, each securing flange is enclosed in a housing formed on the front face of the disc, i.e. on the face intended to be turned towards the outside of the sleeve when the envelope is placed in position.

The dimensions of the securing flanges and of the housings of the disc in which they are positioned are such that said flanges are maintained fixed against any movement.

The cables are consequently maintained at the level of their entrance in the disc in a position fixed with respect to said disc whatever the efforts of traction, torsion or bending, which are applied thereto outside the sleeve.

Such an arrangement makes it possible not to transmit towards the interior of the disc the efforts undergone by the cable outside the sleeve, whether they be of traction, torsion or bending, and thus not to weaken the tightness made between the cables and the disc.

Other forms of embodiment may, of course, be provided without departing from the scope of the present invention.

The invention may be employed in the different sleeves of known types, a port 6 such as the one shown by way of example in FIGS. 1 and 4a may be used for positioning a pressurization value or a grounding terminal.

What is claimed is:

1. Device for mounting at least one cable in a disc, constituted by at least two elements, intended to be located in a cable connection protection sleeve, the disc having an outer portion towards the outside of the sleeve, characterized in that said disc has at least one cable securing means located in the outer portion and fixedly held relative to said disc by fixing means, said at least one cable securing means comprising a cable securing flange enclosed in a housing defined in the outer portion of the disc.

2. Device according to claim 1, characterized in that, when the disc is formed by two elements, each disc element includes a trough defined therein, the trough sized to receive the securing flange substantially therein, the trough having trough portions extending radially away from the corresponding cable mounted in the disc.

3. Device according to claim 1, characterized in that, the disc is formed by three elements comprising two edge elements positioned on either side of an intermediate element, and the housing, which is intended for positioning said at least one cable securing means, is formed by two troughs respectively on each edge element and by two troughs formed on the intermediate element.

4. Device according to claim 2, characterized in that the trough is overall parallelepipedic and has defined in a front of a trough at least one opening, said at least one opening being axially aligned with at least one cable passage presented by the disc.

5. Device according to claim 1, characterized in that the housing is formed by walls molded with the elements of the disc.

6. Device according to claim 1, characterized in that the disc has a wall with first and second parallel ribs formed thereon separated by a hollow, the sleeve comprising an envelope with a third rib formed on an inner face of the envelope, the disc being positioned in the envelope by cooperation of the first and second parallel ribs with the third rib, the hollow and the third rib each being interrupted by respective zones positioned relative to each other to inhibit rotation of the disc relative to the envelope.

7. Device according to claim 1, characterized in that the cable securing flange is constituted by two flange halves intended to be disposed and fixed on one another on either side of the at least one cable to be secured, each said flange half presenting a central zone, of overall parallelepipedic space requirement and comprising at least one semi-cylindrical passage through which said at least one cable is to be secured, and two end zones traversed by holes through which the fixing means may pass.

8. Device according to claim 7, characterized in that an inner wall of the at least one semi-cylindrical passage bears at least one projecting rib.

9. Device for mounting at least one cable in a disc, constituted by at least two elements, intended to be located in a cable connection protection sleeve, the disc having an outer portion towards the outside of the sleeve, characterized in that said disc has at least one cable securing means located in the outer portion and fixedly held relative to said disc by fixing means, said at least one cable securing means comprising a cable securing flange enclosed in a housing defined in the outer portion of the disc, wherein said at least one cable securing means comprises stackable securing rings positioned in the securing flange.

10. Device according to claim 9, characterized in that positioning means are formed on said securing rings so as to facilitate stacking thereof and avoid their relative slide with respect to one another.

11. Device according to claim 10, characterized in that said securing rings comprise inner and outer surfaces, and said positioning means comprise grooves that the outer surface of the rings bears, and ribs borne by the inner surface of the said rings.

12. Device according to claim 10, characterized in that said positioning means comprise a lug adapted to be positioned in an opening, the lug and the opening being disposed in an upper zone of the rings.

13. A disc for mounting at least one cable in a cable protection sleeve, the disc having at least two elements and having a cable passage defined therein, the disc comprising a flange adapted to be secured to the at least one cable;

a housing defined be the elements and having housing portions extending radially past the sidewalls of the cable passage, the flange sized to be substantially received in the housing and having flange portions opposing the housing portions, the flange portions being biased against the housing portion to secure the at least one cable against torsional forces which may be exerted on the cable.

14. The disc of claim 13, wherein the disc comprises an outer portion adapted to be positioned toward the outside of an sleeve, and wherein the housing is defined in an outer portion.

15. The disc of claim 13, wherein the housing comprises at least one trough, the flange being received in the at least one trough.

16. The disc of claim 15, wherein the at least one trough and the flange are overall parallelepipedic.

* * * * *